June 10, 1969  J. J. RYAN  3,448,620

PRESSURE SENSING DEVICE

Filed Sept. 6, 1967

INVENTOR
JOHN J. RYAN
BY
Smythe & Moore
ATTORNEYS

United States Patent Office 3,448,620
Patented June 10, 1969

3,448,620
PRESSURE SENSING DEVICE
John J. Ryan, Glen Cove, N.Y., assignor to H. & R. Development Company, Inc., Nutley, N.J., a corporation of Delaware
Filed Sept. 6, 1967, Ser. No. 665,804
Int. Cl. G01l 7/16
U.S. Cl. 73—419          5 Claims

ABSTRACT OF THE DISCLOSURE

A pressure sensing device wherein a piston is slidably mounted in a bore and an O-ring is interposed between corresponding conical surfaces of the bore and piston to retain the piston in a normal position against fluid pressure acting upon the piston.

---

Figure 1:
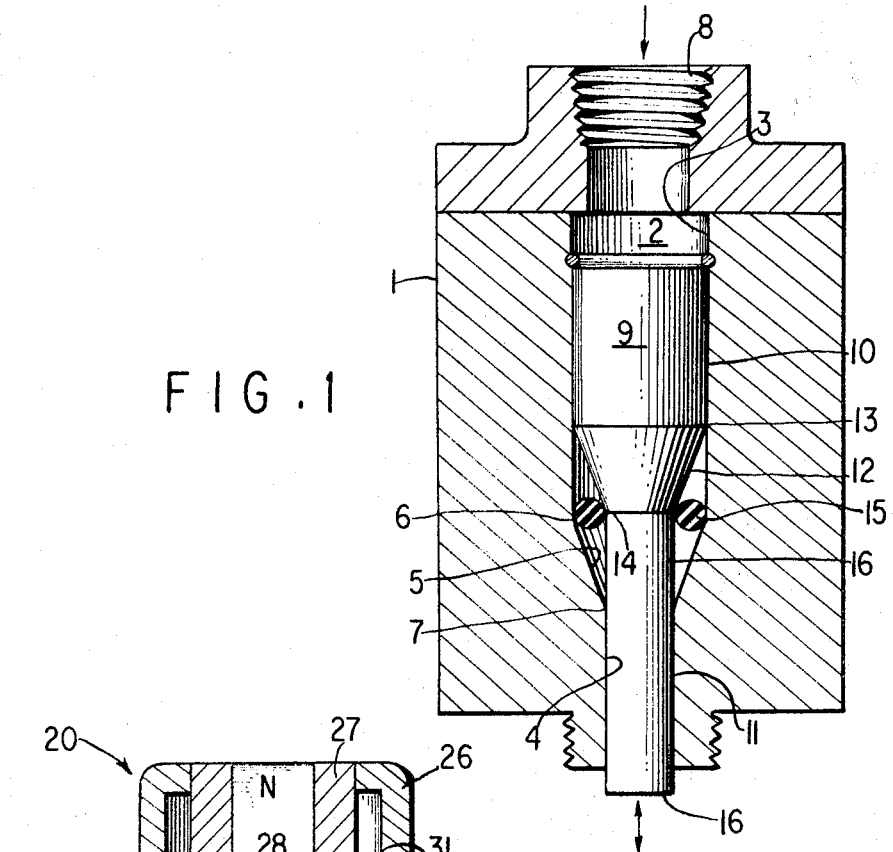

The present invention relates to pressure and indicating devices and more particularly to such a device having a piston biased against fluid pressure by an elastomeric O-ring interposed between corresponding conical surfaces of the piston and bore.

Many forms of gauges, regulators and differential indicators have been proposed to measure pressure or vacuum in fluid systems. While such devices can measure pressure accurately, they tend to become rather complex in structure with resultant relatively high manufacturing costs. Also, such known devices are susceptible to overload damage if exposed to severe overload conditions or to overload conditions for an extended period of time. Furthermore, it has been difficult to provide such a device which is simple in construction yet satisfactorily both senses and indicates fluid pressure conditions.

It is therefore an object of this present invention to provide an improved fluid pressure sensing device.

Another object of the invention is to provide a fluid pressure sensing device which embodies a minimum of components yet gives accurate results.

In one aspect of the invention, the pressure sensing device includes a housing having a bore therein, the bore having first and second diameter portions interconnected by a conical surface. A piston is slidably positioned within the bore and similarly has first and second diameter portions corresponding to the bore diameters. Similarly, a conical surface interconnects the piston diameters. An elastomeric O-ring which has inner and outer diameters corresponding to the piston and bore first and second diameters is positioned between the piston and bore conical surfaces. The upper end of the piston is connected to a source of fluid pressure and the O-ring biases the piston against the fluid pressure to a normal position. The smaller diameter end of the piston may project from the housing and have indicator means thereon which are exposed in proportion to the fluid pressure exerted against the piston and the resulting compression of the O-ring.

The pressure sensing device of the present invention may be incorporated in a differential pressure indicator employing magnetic means to retain the parts of the indicator in their normal positions until a predetermined surge of fluid pressure releases the magnetic means to indicate that a surge has occurred. This modified pressure sensing device may comprise a housing having a bore with first and second diameters and a conical connecting surface therebetween. A piston is slidably mounted within the bore and also has first and second diameters corresponding to said bore diameters with an intermediate conical surface therebetween. Magnetic means are mounted on the piston, the piston being movable toward and away from a first position. An elastomeric O-ring is positioned between the piston and the bore so as to urge the piston toward the first position and normally retain it in the first position. The housing is provided with a fluid duct communicating with a source of fluid pressure and the larger diameter end of the piston so as to urge the piston in a direction away from the first position. A second magnetic means is movably mounted toward and away from the first magnetic means and is magnetically retained toward said first magnetic means when the first magnetic means is in the first position. There is a spring which urges the second magnetic member away from the first magnetic means to overcome the force of magnetic attraction when, under predetermined fluid pressure, the first magnetic means is urged away from its first position.

Other objects, advantages and features of the present invention will be apparent from the following description when taken in conjunction with the accompanying drawings, which are merely exemplary.

Figure 2:
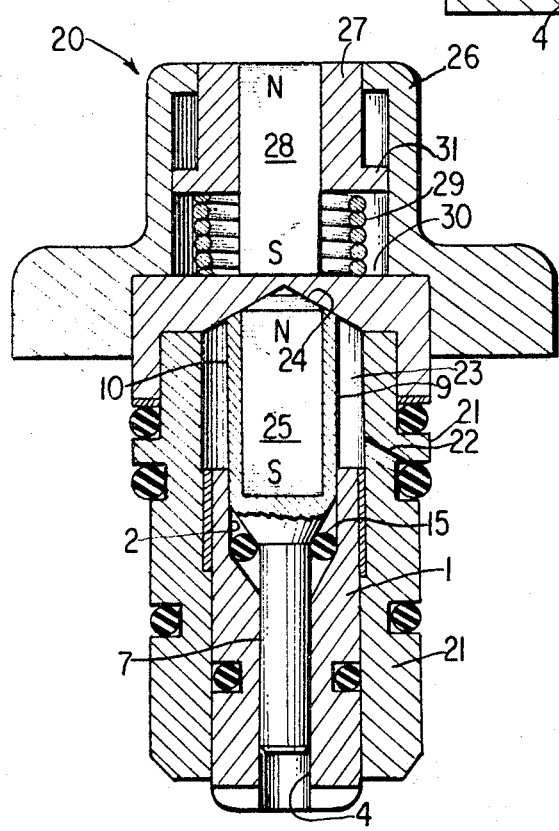

In the drawings:

FIG. 1 is a longitudinal sectional view of the pressure sensing device of the present invention; and FIG. 2 is a longitudinal sectional view of a modification of the invention for indicating a surge of fluid pressure.

Referring to the drawings wherein like reference symbols indicate the same parts throughout the various views, a specific embodiment of the invention will be described in detail.

The pressure sensing device of FIG. 1 comprises a housing 1 having a bore 2 therein, said bore having a major diameter 3 and a minor diameter 4. A conical surface 5 interconnects the major and minor diameters at junctions 6 and 7, respectively. The major diameter end of the housing is provided with a connecting member 8 for connecting the pressure sensing device to a source of fluid pressure.

Slidably mounted within the bore 2 is a piston 9 having a major diameter portion 10 and a minor diameter portion 11 interconnected by a conical surface 12 to form junctions 13 and 14 with the major and minor diameter portions, respectively. The major and minor diameters of the piston and bore correspond so that these respective portions of the piston and bore permit sliding movement of the piston within the bore but with a close fit.

An O-ring 15 of an elastomeric material, such as rubber, synthetic rubber or a suitable synthetic plastic, is positioned between the piston and the bore as illustrated in FIG. 1. The inner diameter of the O-ring 15 corresponds to the minor diameter of the bore and piston. The outer diameter of the O-ring corresponds to the major diameter of the bore and piston. The O-ring 15 is shown in its normal uncompressed condition and is situated between bore junction 6 and piston junction 14.

The minor diameter end of the piston is indicated at 16 and extends outwardly of the housing to indicate pressure upon the upper end of the piston. The piston end 16 may be provided with a suitable indicator, such as color or graduations, which will indicate the extent to which the O-ring 15 is compressed and, accordingly, the amount of pressure being exerted on the upper end of the piston.

In operation of the pressure sensing device, a fluid pressure is applied to the major diameter end of the plunger through connection 8. The plunger is moved downwardly, as viewed in FIG. 1, to deform O-ring 15 and the sealing pressure between the piston, housing bore and the O-ring is increased. Since this increase in sealing pressure is proportional to the fluid pressure applied to the major diameter end of the piston, pressure values can be indicated by the displacement of the indicating end 16 at the lower end of the piston.

Sensitivity in a particular pressure range can be achieved by modification of the ratio between the major and minor diameters, varying the contours of the conical connecting surfaces, varying the taper angles of the conical surfaces, or variation in the O-ring material.

Positive or negative or vacuum pressures can be sensed by a single unit by providing a double-ended plunger with opposed conical sections and two O-rings in the bore of the housing.

In the modification of FIG. 2, the pressure sensing device as described above is incorporated in a differential pressure indicator having a surge reaction block and indicated generally at 20. The housing 1 is incorporated in an outer housing 21 having a fluid duct 22 which is connected to a source of fluid pressure. The duct 22 opens into a chamber 23 and exerts a fluid pressure upon the upper end 24 of the piston 9. Piston 9 is provided with a permanent magnet 25 having its North and South Poles positioned as indicated.

Mounted on the outer housing 21 is an enclosure 26 in which is slidably mounted a plunger 27 having a permanent magnet 28 therein, with its north and south poles positioned as shown with respect to magnet 25. A spring 29 is provided to bias the plunger 27 outwardly of the enclosure.

In the operation of the modified device, fluid under pressure through the duct 22 acts upon the top end 24 of piston 9 to urge the piston downwardly against the force exerted by the elastomeric O-ring 15. Whenever the pressure exerted by the fluid through the duct 22 is greater than the force of the O-ring 15, the piston 9 is pushed downwardly in the bore 2. After the magnet 25 has moved a short distance away from magnet 28, the force of magnetic attraction between the two magnets is less than the force of the spring 29, and the magnetic element 28 and the plunger 27 are driven away from top wall 30 of outer housing 21. The plunger 27 moves outwardly until its flange 31 abuts the inside surface of the enclosure 26. Thus, the enclosure 26, which may be of a suitable eye-catching color, is exposed to indicate that the pressure is greater than the predetermined value in accordance with which the O-ring 15 was selected.

The pressure sensing device of the present invention may be used in a large number of pressure system components including gauges, regulators, switches, differential indicators and other units requiring control indication or sensing of pressure between system sections or system and environment. This pressure sensing device may be used in place of conventional diaphragms, metallic or plastic bellows, piston and cylinder assemblies, and Bourdon tubes.

The device of the present invention has a number of advantages over known devices including a comparatively low cost because of simplicity in manufacturing and easily maintained tolerances. Additionally, the simple structure and minimum of components make miniaturization considerably more feasible than present currently used devices. In operation, due to its simplicity of structure and the fact that the device is relatively unaffected by any minor contamination of the fluid pressure system, the present device gives more reliable results.

It is to be understood that changes can be made in various details of construction and arrangement of parts without departing from the spirit of the invention, except as defined in the appended claims.

What is claimed is:

1. A pressure sensing device comprising a housing having a bore therein, said bore having a first diameter and a larger second diameter connected by a conical surface therebetween, piston means slidably positioned within said bore and having first and second diameters corresponding to said bore diameters and an intermediate conical section therebetween, and an elastomeric O-ring positioned between said piston means and said bore, said O-ring having inner and outer diameters corresponding to said first and second diameters.

2. A pressure sensing device comprising a housing having a bore therein, said bore having a first diameter and a larger second diameter connected by a conical surface therebetween, piston means slidably positioned within said bore and having first and second diameters corresponding to said bore diameters and an intermediate conical section therebetween, and an elastomeric O-ring positioned between said piston means and said bore, wherein the larger diameter end of said piston means is connected to a source of fluid pressure to be sensed, and wherein said piston means has its normal position before pressure is applied thereto with the junction of its smaller diameter and conical surface opposed from the junction of the bore larger diameter and its conical surface.

3. A pressure sensing device as claimed in claim 2 wherein said O-ring is uncompressed when located between said piston means and said bore at said opposed junctions.

4. A pressure sensing device as claimed in claim 1 wherein the smaller diameter end of said piston means projects from said housing as an indicator.

5. A pressure sensing device comprising a housing having a bore therein, said bore having first and second diameters with a conical surface therebetween, piston means slidably positioned within said bore and having first and second diameters corresponding to said bore diameters and an intermediate conical surface therebetween, first magnetic means movable with said piston means toward and away from a first position, an elastomeric O-ring between said piston means and said bore urging said piston means toward said first position and normally retaining said piston means in said first position, fluid duct means in said housing for communicating with a source of fluid pressure and the larger diameter end of said piston means to urge said piston means in a direction away from said first position, second magnetic means movable toward and away from said first magnetic means and magnetically retained toward said first magnetic means when said first magnetic means is in said first position, and spring means for urging said second magnetic means away from said first magnetic means to overcome the force of magnetic attraction therebetween when said first magnetic means is urged away from said first position.

References Cited

UNITED STATES PATENTS

| 2,942,572 | 6/1960 | Pall | 116—117 |
| 3,247,824 | 4/1966 | Rodgers | 73—419 |

LOUIS R. PRINCE, Primary Examiner.

DENIS E. CORR, Assistant Examiner.

U.S. Cl. X.R.

92—85; 116—114